Figure 4:
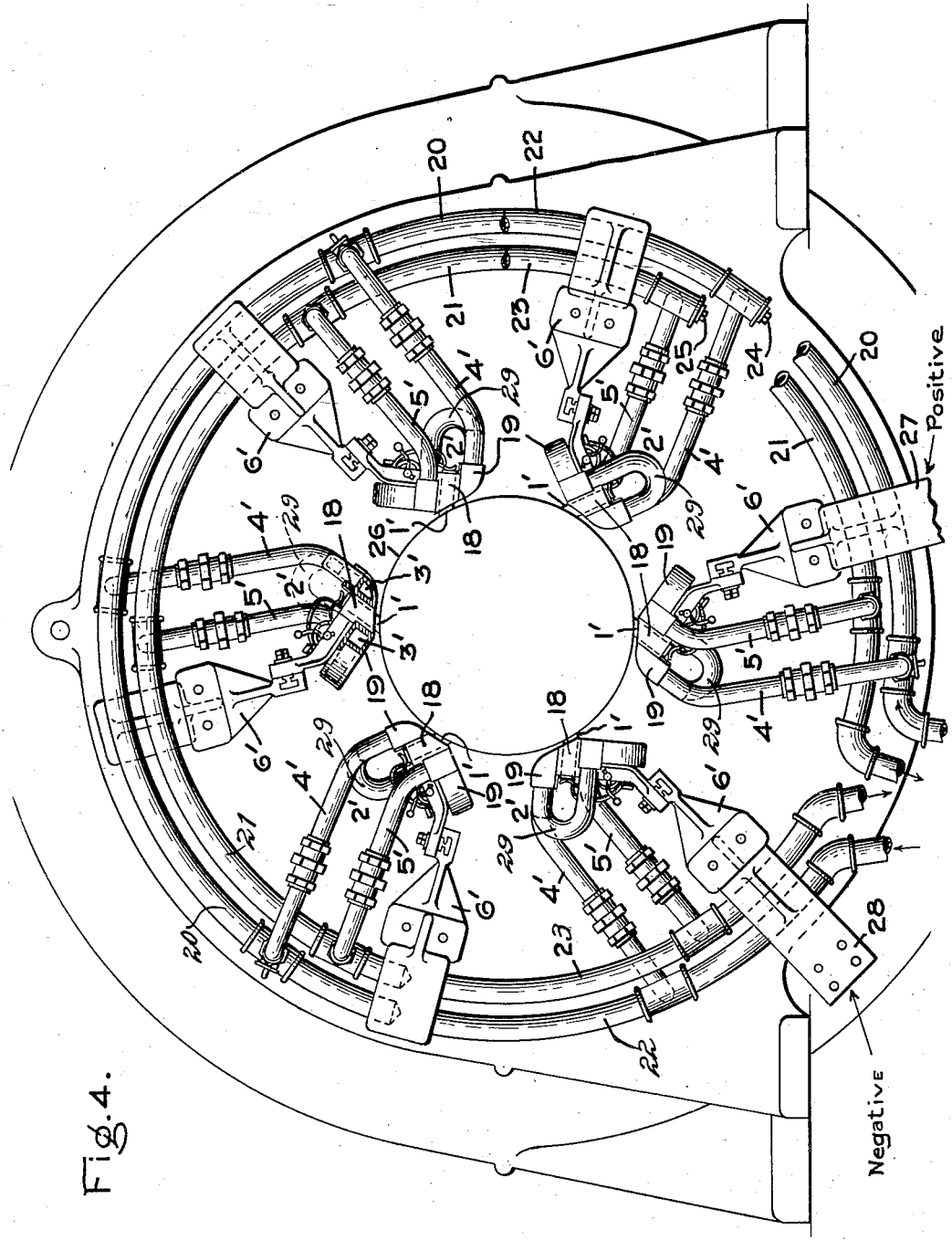

J. C. BARRY.
DYNAMO ELECTRIC MACHINE.
APPLICATION FILED OCT. 13, 1911.
1,066,175.
Patented July 1, 1913.
2 SHEETS—SHEET 1.
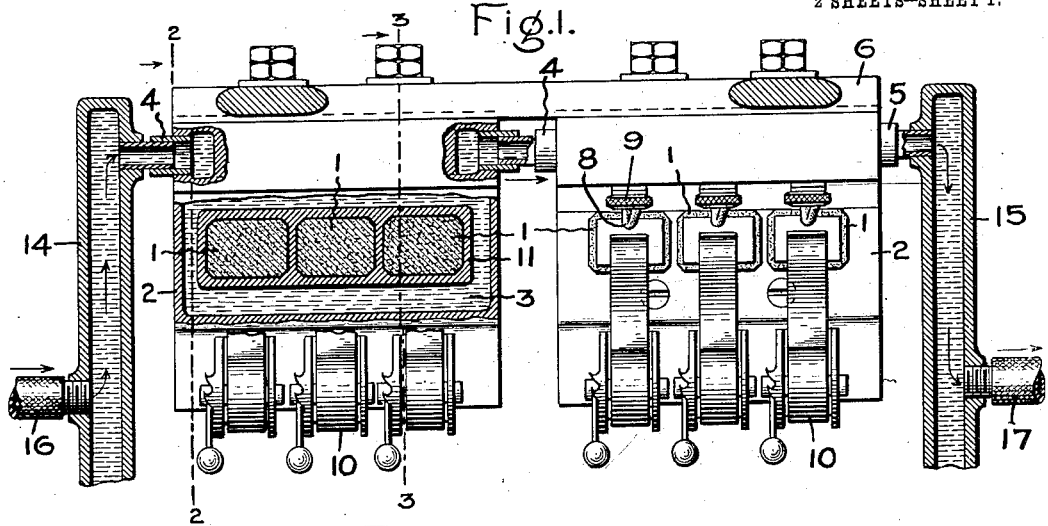
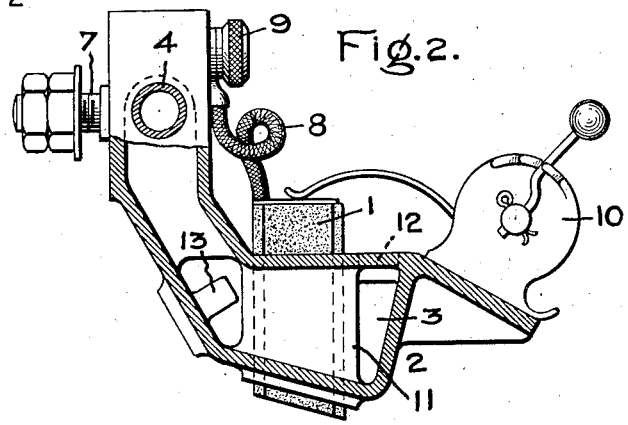
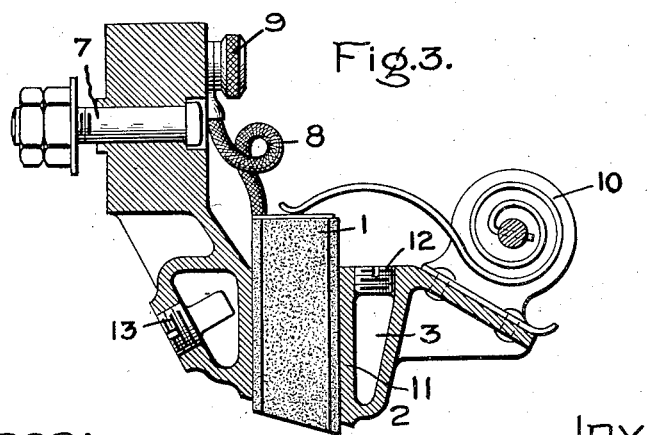
Witnesses:
Marcus L. Byng.
J. Ellis Glu
Inventor:
John C. Barry,
by
His Attorney.

J. C. BARRY.
DYNAMO ELECTRIC MACHINE.
APPLICATION FILED OCT. 13, 1911.

1,066,175.

Patented July 1, 1913.
2 SHEETS—SHEET 2.

Witnesses:
Marcus L. Byng.
J. Ellis Glen

Inventor:
John C. Barry,
by Albert G. Davis
His Attorney.

UNITED STATES PATENT OFFICE.

JOHN C. BARRY, OF LYNN, MASSACHUSETTS, ASSIGNOR TO GENERAL ELECTRIC COMPANY, A CORPORATION OF NEW YORK.

DYNAMO-ELECTRIC MACHINE.

1,066,175. Specification of Letters Patent. Patented July 1, 1913.

Application filed October 13, 1911. Serial No. 654,472.

*To all whom it may concern:*

Be it known that I, JOHN C. BARRY, a citizen of the United States, residing at Lynn, county of Essex, State of Massachusetts, have invented certain new and useful Improvements in Dynamo-Electric Machines, of which the following is a specification.

My invention relates to dynamo electric machines and more particularly to the brush rigging of such machines.

It is well known that a great deal of the heat that is generated about the collector surface of a dynamo electric machine is due to the friction and $I^2R$ losses of the brushes. It has been found by experiment that this heat raises the temperature of the brush-holders and is communicated by them to the collector surface.

My invention has for its object the dissipation of this heat so that it will not be taken up by the collector surface.

The various features of my invention are pointed out with particularity in the claims annexed to and forming a part of my specification.

For a better understanding of my invention reference may be had to the following description taken in connection with the accompanying drawings, in which—

Figure 1 is a plan view partly in section, of a brush rigging embodying my invention; Fig. 2 is a section on the line 2—2 of Fig. 1; Fig. 3 is a section on the line 3—3 of Fig. 1, and Fig. 4 is an elevation of a dynamo electric machine embodying a modified form of my invention.

Referring to Figs. 1, 2 and 3 of the drawings, 1 are brushes of a dynamo electric machine surrounded by members 2, each having passages 3 therethrough, an inlet or inlet opening 4 and an outlet or outlet opening 5, whereby cooling fluid may be circulated about the brushes 1. The members 2 are fastened to the brush-holder brackets 6 by means of bolts 7. The brush-holder brackets are supported by but insulated from the brush-holder yoke in the usual way. The brushes 1 have pigtails 8 which I have shown as being fastened to the members 2 by thumb screws 9. Spring tension devices 10 are also fastened to the members 2 for holding the brushes in contact with the collector surface. The brushes 1 fit in boxes 11 formed in the members 2. I have shown each of the members 2 provided with three boxes, but it is evident that they may be provided with any number, or only one. The metal which forms the boxes 11 is surrounded by passages as clearly seen from the drawings. Plugs 12 and 13 are screwed into the outer walls of the passages 3. These plugs allow access to the passages so that any foreign substance, which may clog up the passages can be easily removed. Flattened pipes or tubes 14 connect the inlet openings 4 of say the positive members 2 and flattened tubes 15 connect the outlet openings 5. Similar tubes connect the inlet and outlet openings of the negative members. These tubes act as bus rings to collect the current from the members 2 of the same polarity. Insulating tubes 16 and 17 convey the cooling fluid to and from the tubes 14 and 15. The cooling fluid, which is preferably water, enters the insulating tube 16 flows through the flattened tube 14, and thence into the inlets 4 of the first member 2, through passages which connect the inlets to passages 3, through the passages 3 around the brushes 1, through passages which connect the passages 3 to the outlets 5, and out of the outlets 5. The cooling fluid then flows through the second member 2 and finally reaches the flattened tube 15 and is conveyed away from the machine by the insulating tube 17. As shown in Fig. 1, two members 2 are connected in series, but any number of separate members may be used depending on the length of the commutator.

Referring to the modification shown in Fig. 4, each of the members 2' is composed of two parts; one consists of brush-holders 18 having boxes in which the brushes 1' move and the other consists of a member 19 closely fitting the exterior of the boxes of the brush holders and having passages 3', and an inlet 4' and an outlet 5'. The brush holders 18 are fastened to brush-holder brackets 6', which are fastened to but insulated from a brush holder yoke (not shown). The inlets of say the positive members 2' are connected to a pipe or tube 20, the outlets being connected to a pipe 21. The inlets of the negative members 2' are connected to a pipe or tube 22 and the outlets to a pipe 23. The inlets are curved so as to avoid the pipes 21 and 23. The pipes 20 and 21 are electrically connected to the positive brush-holder brackets 6', the ends of the pipes being sealed by the last positive bracket 6' as clearly seen in the drawings. The pipes 22 and 23 are electrically connected to the negative brush-holder brackets 6', the ends of the pipes being closed by plugs 24 and 25. The pipes 20 and 21 which form the positive bus ring are at one end of the collector surface 26, and as shown in Fig. 4 at the outer end, and the pipes 22 and 23 which form the negative bus ring are at the other end of the collector surface, that is, the end near the armature. The cables which convey the current from the dynamo electric machine are connected to the terminals 27 and 28. Insulating tubes or pipes conduct the cooling fluid to the pipes 20 and 22, and similar insulating tubes conduct the fluid from the pipes 21 and 23. Cooling fluid enters the pipes 20 and 22, flows through the inlets of the members 19 into the passages 3' which extend along one side of the boxes in which the brushes move, across through the pipes 29 and down on the other side of the brushes, through the outlets and thence through the pipes 21 and 23, from whence it is conveyed away from the dynamo electric machine.

It has been found by experiment that by passing two gallons of water through brush-holders built in accordance with my invention the temperature was reduced in the ratio of 5 to 3 in comparison with the temperature obtained with standard brush-holders. It is therefore possible with ordinary brushes, to greatly reduce the radiating surface of the commutator. Further than this, by the use of my invention it is possible to greatly increase the peripheral speed of commutators and at the same time increase the brush pressure so as to maintain the brushes on the commutator and still keep the temperature of the commutator within reasonable limits.

I desire it to be understood that my invention is not limited to the particular constructions shown and described, and I aim in the appended claims to cover all modifications which do not depart from the spirit and scope of my invention.

What I claim as new and desire to secure by Letters Patent of the United States, is:—

1. In combination, a brush for dynamo electric machines, and a member having a box for said brush, passages around said box, an inlet, an outlet, a passage from said inlet to said passages around said box and a passage from said passages around said box to said outlet, means for supplying cooling fluid to said inlet comprising a pipe, and a pipe for conducting the fluid from said outlet.

2. In combination, positive and negative brushes for a dynamo electric machine, members having boxes for said brushes, passages around said boxes, inlets and outlets, a pipe for conducting cooling fluid to the inlets of said members for the positive brushes, said pipe forming a positive bus ring, and a pipe for conducting cooling fluid to the inlets of said members for the negative brushes, said last mentioned pipe forming a negative bus ring.

3. In combination, positive and negative brushes for a dynamo electric machine, members having boxes for said brushes, passages around said boxes and openings, pipes for conducting fluid to and from said openings of said members for the positive brushes, said pipes forming a positive bus ring, and pipes for conducting fluid to and from said openings of said members for the negative brushes, said last mentioned pipes forming a negative bus ring.

4. In combination with the collector surface of a dynamo electric machine, positive and negative brushes therefor, members having boxes for said brushes, passages around said boxes, inlets and outlets, a pipe for conducting cooling fluid to the inlets of said members for the positive brushes, said pipe forming a positive bus ring at one end of said collector surface, and a pipe for conducting cooling fluid to the inlets of said members for the negative brushes, said last mentioned pipe forming a negative bus ring at the other end of said collector surface.

5. In combination with the collector surface of a dynamo electric machine, positive and negative brushes therefor, members having boxes for said brushes, passages around said boxes and openings, pipes for conducting fluid to and from said members for the positive brushes, said pipes forming a positive bus ring at one end of said collector surface, and pipes for conducting a fluid to and from said openings of said members for the negative brushes, said last mentioned pipes forming a negative bus ring at the other end of said collector surface.

6. In combination, a brush for dynamo electric machines, and a member comprising two parts, one being a brush-holder having a box for said brush and the other being a member closely fitting the exterior of said box and having passages around said box, an inlet and an outlet whereby cooling fluid may be circulated about said brush.

7. In combination, a brush for dynamo electric machines, a member comprising two parts, one being a brush-holder having a box for said brush and the other being a member closely fitting the exterior of said box and having passages around said box, an inlet and an outlet, means for supplying cooling fluid to said inlet, and means for conducting the fluid from said outlet.

8. In combination, positive and negative brushes for a dynamo electric machine, members each composed of two parts, one being a brush-holder having a box for one of said brushes and the other being a member having passages around said box, an inlet and an outlet, a pipe for conducting fluid to the inlets of said members for the positive brushes, said pipe forming a positive bus ring, and a pipe for conducting cooling fluid to the inlets of said members for the negative brushes, said last mentioned pipe forming a negative bus ring.

9. In combination, with the collector surface of a dynamo electric machine, positive and negative brushes therefor, members each composed of two parts, one of said parts being a brush-holder having a box for one of said brushes and the other being a member having passages around said box, an inlet and an outlet, a pipe for conducting cooling fluid to the inlet of said members for the positive brushes, said pipe forming a positive bus ring at one end of said collector surface, and a pipe for conducting cooling fluid to the other end of said members for the negative brushes, said last mentioned pipe forming a negative bus ring at the other end of said collector surface.

10. In combination, positive and negative brushes for a dynamo electric machine, members each composed of two parts, one of said parts being a brush-holder having a box for one of said brushes, and the other being a member having passages around said box, an inlet and an outlet, pipes for conducting fluid to said inlets and from said outlets of said members for the positive brushes, said pipes forming a positive bus ring, and a pipe for conducting fluid to said inlets and from said outlets of said members for the negative brushes, said last mentioned pipes forming a negative bus ring.

11. In combination with a collector surface of a dynamo electric machine, positive and negative brushes therefor, members each composed of two parts, one of said parts being a brush-holder having a box for one of said brushes and the other being a member having passages around said box, an inlet and an outlet, pipes for conducting fluid to said inlets and from said outlets of said members for the positive brushes, said pipes forming a positive bus ring at one end of said collector surface, and pipes for conducting fluid to said inlets and from said outlets of said members for the negative brushes, said last mentioned pipes forming a negative bus ring at the other end of said collector surface.

In witness whereof, I have hereunto set my hand this eleventh day of October, 1911.

JOHN C. BARRY.

Witnesses:
 JOHN A. McMANUS, Jr.,
 FRANK G. HATTIE.